No. 833,035. PATENTED OCT. 9, 1906.
F. W. FÖRSTER.
PIPE CUTTER.
APPLICATION FILED JUNE 18, 1906.
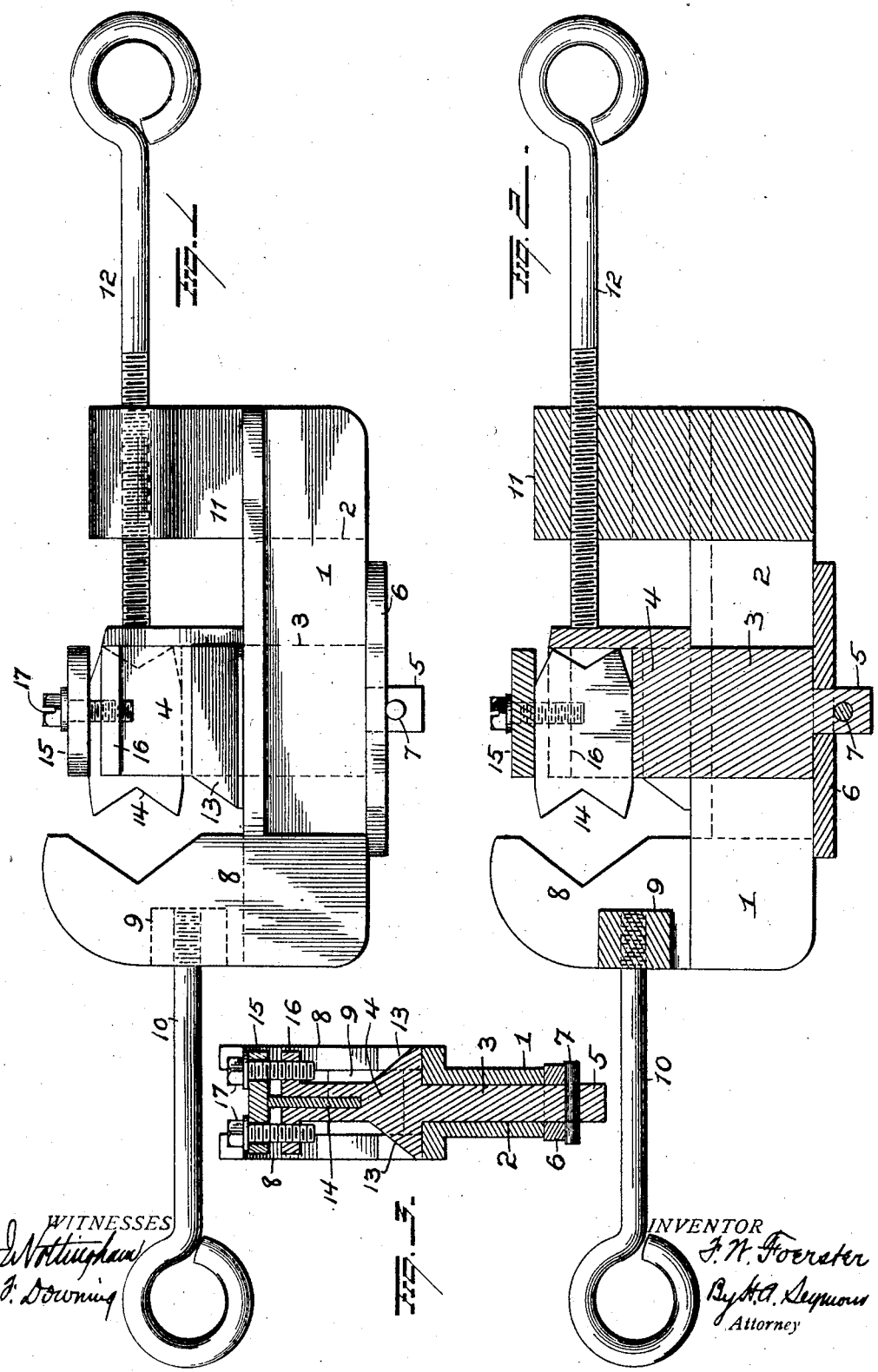

UNITED STATES PATENT OFFICE.

FRIEDRICH WILHELM FÖRSTER, OF BURLINGTON, IOWA.

PIPE-CUTTER.

No. 833,035.          Specification of Letters Patent.          Patented Oct. 9, 1906.

Application filed June 18, 1906. Serial No. 322,250.

*To all whom it may concern:*

Be it known that I, FRIEDRICH WILHELM FÖRSTER, a resident of Burlington, in the county of Des Moines and State of Iowa, have invented certain new and useful Improvements in Pipe-Cutters; and I do hereby declare the following to be a full, clear, and exact description of the invention, such as will enable others skilled in the art to which it appertains to make and use the same.

My invention relates to improvements in pipe-cutters, the object of the invention being to provide an improved carrier for the cutter and improved supporting devices therefor having handles at both ends; and with these and other objects in view the invention consists in certain novel features of construction and combinations and arrangements of parts, as will be more fully hereinafter described, and pointed out in the claims.

In the accompanying drawings, Figure 1 is a view in side elevation illustrating my improvements. Fig. 2 is a view in longitudinal section, and Fig. 3 is a view in cross-section.

1 represents the metal stock or guide frame, made with a longitudinal slot 2 to receive and guide a tongue 3 on the knife-carrier 4, and said tongue 3 is made with a lug 5 at its lower end, passed through an opening in a plate 6, and a cross-pin 7 or other suitable device is located in an opening in lug 5 to hold the plate in position and secure the carrier to the stock or frame 1. The frame 1 has parallel notched jaws 8 at one end, which are connected by a block 9, and the latter is made with a screw-threaded hole to receive the threaded end of a handle 10. The other end of frame or stock 1 is made with a post 11, having an internally-screw-threaded sleeve at its end to receive the threaded handle 12, which latter also serves to clamp the cutter against the pipe, as will be readily understood.

The carrier 4 is provided with base-flanges 13 to have an extended bearing on the flanged edge of stock or frame 1, and said carrier is made with a longitudinal groove or recess in its outer end to receive the cutter-blade 14. The blade 14 is clamped in place by a cap-plate 15, and the carrier 4 is made with flanges or lips 16 at opposite sides to receive screws 17, passed through the cap-plate 15, to securely clamp the blade in the carrier.

The cutter-blade 14 is made with sharp V-shaped ends, so as to be reversible, and when in position in the carrier and the latter forced up the pipe will be held in the notched jaws 8, and cutter 14 will cut through the pipe when the stock is turned around the same. This form of cutter cuts through the pipe and does not press the metal into the pipe, as does the ordinary cutting roller or disk, and does not require any reaming of the pipe after cutting.

The carrier can be quickly slid on the stock or frame to bring the cutter-blade against the pipe and be securely clamped and adjusted by the screw-handle 12. The device is extremely simple in construction and cheap to manufacture and is strong and durable in use.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a pipe-cutter, the combination with a stock or frame, a fixed jaw at one end thereof and a post at the other end, of a sliding carrier mounted on the stock or frame between said jaw and post, said carrier having a slot therein open at one end and at one side, a cutter removably disposed in said slot and projecting beyond the open end thereof, a clamping-plate secured to the carrier and engaging one edge of the cutter, and an adjusting-screw passing through said post and engaging the carrier.

2. In a pipe-cutter, the combination with a stock or frame, a fixed jaw at one end thereof and a fixed post at the other end, of a handle secured to the fixed jaw, a sliding carrier mounted on the stock or frame between the jaw and post, a threaded handle passing through the post and engaging the carrier, said carrier having a slot open at one end and at one side, a removable cutter provided with a V-shaped cutting end, mounted in said carrier, and a cap-plate secured to the carrier and engaging the free edge of said cutter.

3. In a pipe-cutter, the combination with a stock or frame, two fixed jaws at one end thereof, a block between said jaws and a handle secured to said block, of a carrier mounted to slide on the stock or frame and having a slot therein open at one end and at one side, a reversible cutter in said slot and having V-shaped cutting ends, a clamping-plate secured to the carrier and engaging the free edge of the blade, and a threaded handle at the other end of the stock or frame to adjust the carrier toward the fixed jaws.

4. In a pipe-cutter, the combination with a stock or frame having a fixed jaw at one end and a post at the other end, said stock or frame also having an elongated slot between the fixed jaw and post, of a carrier on the frame between the jaw and post and having a lug projecting through and movable in the slot in the stock or frame, a pin passing through said lug, a cutter mounted in the carrier, a screw passing through said post and engaging the carrier and a handle secured to the fixed jaw.

5. In a pipe-cutter, the combination with a stock or frame, and a carrier having a tool-slot, a reversible blade having V-shaped cutting edges at both ends, and a clamp to secure the blade in the slot of the carrier.

In testimony whereof I have signed this specification in the presence of two subscribing witnesses.

FRIEDRICH WILHELM FÖRSTER.

Witnesses:
   T. W. KRIECHBAUM,
   CHAS. C. CLARK